(12) United States Patent
Hong et al.

(10) Patent No.: US 8,097,680 B2
(45) Date of Patent: Jan. 17, 2012

(54) LOW GLOSS THERMOPLASTIC RESIN HAVING EXCELLENT HEAT RESISTANCE AND IMPACT STRENGTH AND METHOD OF PREPARING THE SAME

(75) Inventors: Jae Keun Hong, Uiwang-si (KR); Byeong Do Lee, Uiwang-si (KR); Ho Ryong Sun, Uiwang-si (KR); Young Sub Jin, Uiwang-si (KR); Hwan Seok Park, Uiwang-si (KR); Sung Kwan Kim, Uiwang-si (KR); Jae Woo Park, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 56 days.

(21) Appl. No.: 12/647,714

(22) Filed: Dec. 28, 2009

(65) Prior Publication Data
US 2010/0168354 A1   Jul. 1, 2010

(30) Foreign Application Priority Data
Dec. 29, 2008 (KR) ............... 2008-135538

(51) Int. Cl.
*C08F 8/00* (2006.01)
(52) U.S. Cl. ..................... 525/193; 525/194
(58) Field of Classification Search .......... 525/193, 525/194
See application file for complete search history.

(56) References Cited

U.S. PATENT DOCUMENTS

| 3,742,092 A | * | 6/1973 | Duke et al. ............ 525/193 |
| 4,652,614 A | | 3/1987 | Eichenauer et al. |
| 4,659,790 A | | 4/1987 | Shimozato et al. |
| 4,668,737 A | | 5/1987 | Eichenauer et al. |
| 4,757,109 A | | 7/1988 | Kishida et al. |
| 5,091,470 A | | 2/1992 | Wolsink et al. |
| 5,237,004 A | | 8/1993 | Wu et al. |
| 5,412,036 A | | 5/1995 | Traugott et al. |
| 5,446,103 A | | 8/1995 | Traugott et al. |
| 5,475,053 A | | 12/1995 | Niessner et al. |
| 5,574,099 A | | 11/1996 | Noro et al. |
| 5,635,565 A | | 6/1997 | Miyajima et al. |

FOREIGN PATENT DOCUMENTS

| EP | 0721962 A2 | 7/1996 |
| GB | 1042783 A1 | 9/1966 |

OTHER PUBLICATIONS

Extended European Search Report in counterpart European Application No. 09180865.9, dated Apr. 16, 2010.

* cited by examiner

*Primary Examiner* — Nathan M Nutter
(74) *Attorney, Agent, or Firm* — Summa, Additon & Ashe, P.A.

(57) ABSTRACT

A thermoplastic resin of the present invention is prepared by copolymerizing conjugated diene rubber (A), rubbery aromatic copolymer (B), heat resistant aromatic vinyl compound (C), aromatic vinyl compound (D), unsaturated nitrile compound (E) and cross linking agent (F) and can have excellent heat resistance, impact strength, and low gloss.

15 Claims, No Drawings

LOW GLOSS THERMOPLASTIC RESIN HAVING EXCELLENT HEAT RESISTANCE AND IMPACT STRENGTH AND METHOD OF PREPARING THE SAME

CROSS REFERENCE TO RELATED APPLICATIONS

This application claims priority from Korean Patent Application No. 2008-0135538, filed Dec. 29, 2008 in the Korean Intellectual Property Office, the disclosure of each of which is incorporated herein by reference in its entirety.

FIELD OF THE INVENTION

The present invention relates to a low gloss thermoplastic resin and method of preparing the same.

BACKGROUND OF THE INVENTION

ABS (acrylonitrile-butadiene-styrene) resins generally have a good balance of properties such as impact resistance, chemical resistance, heat resistance, and mechanical strength as well as processability, and are easily molded. Accordingly ABS resins have been widely used for various products such as automobile parts, housings for electrical/electronic appliances, and the like, in addition to small household and personal items and amenities.

Conventional resin products have a solid and glossy surface. Recently, however, there has been an increasing demand for thermoplastic resins having both low gloss and a soft touch surface for interior parts of automobiles and housings for electrical/electronic appliances which people often touch or see over a long period of time. Furthermore, because of strict regulations protecting the environment, there is also an increasing need for a low gloss resin which is prepared without a coating process and which is directly moldable.

A widely used method used for preparing low gloss ABS resin with heat resistance partially replaces components of the ABS resin with heat resistant copolymers, such as styrene monomers, imide monomers and the like (John Scheirs Ed., "Modern Styrenic Polymers: Polystyrenes and Styrenic Copolymer, John Wiley & Sons Ltd, 2003, page 321~340). A quencher can also be added to increase heat resistance of ABS resins. Examples of such heat resistant resins include α-methylstyrene-styrene-acrylonitrile (AMS-SAN) copolymer and N-phenyl maleimide-styrene-acrylonitrile (PMI-SAN) copolymer. In addition, inorganic loading materials, acrylic resins or cross-linked styrene resins can be added to lower gloss. Mixtures of such materials with other raw materials of the ABS resin can be melt-extruded.

In another method, a heat resistant ABS resin can be prepared using one of the above heat resistant copolymers, and gloss can be removed in a post processing step, for example, ejection molding using texture mold or a painting process. As yet another method, the roughness of the surface of a heat resistant ABS resin prepared using a heat resistant copolymer as described above can be controlled to have a micro-sized scale by controlling the size of the dispersed phase rubber particles. The surface prepared by above method reduces gloss by dispersing incident light.

One method for improving heat resistance and gloss of ABS resin includes melt extruding a heat resistant copolymer resin made using α-methylstyrene (AMS) or N-phenyl maleimide (PMI), a heat resistant copolymer resin matrix, and graft rubber with improved compatibility and additives. See U.S. Pat. No. 4,659,790, U.S. Pat. No. 4,757,109. Methods using additives to provide low gloss are convenient but quality can be irregular, depending on the dispersed phase. Further, the ratio of final products is increased by the high ratio of additives used.

Although extrusion processes using a texture mold or painting can be conducted without the additives, if a texture mold is used, processing costs can increase and pollution can also be a problem due to the additional processing step.

U.S. Pat. No. 5,475,053 discloses using a graft copolymer as a quencher and U.S. Pat. No. 4,652,614 discloses using a spherical graft copolymer which has about 5 to 80% of rubber to provide low gloss by controlling size and characteristics of the dispersed phase rubber particles. U.S. Pat. No. 4,668,737 discloses using spherical rubber particle having a core-shell structure with a size of about 0.05 to about 20 μm. Further, U.S. Pat. No. 5,237,004 discloses using polymer particles with a size of about 2 to 15 μm. However, using rubber particle additives can cause problems such as exfoliation, reduced physical properties or partially increased gloss, as well as result in high processing costs. Further it is difficult to provide a soft surface due to the fineness of such particles as compared with rubber particles prepared by bulk polymerization or solution polymerization.

A continuous bulk polymerization process can be used to control gloss and rubber particle diameter to provide a resin with both low gloss and heat resistance without requiring an extra process step. U.S. Pat. Nos. 5,091,470, 5,412,036, and 5,446,103 disclose a method for preparing heat resistant ABS resin using rubber including PMI monomer and butadiene by continuous polymerization. Heat resistant ABS resin prepared using PMI monomer can have both excellent heat resistance and high impact strength using a single process. However, in the above method, there is a difference between the composition of a graft polymer rubber prepared during an initial continuous polymerization step and a matrix composition prepared during a latter part of the continuous polymerization process due to the difference in the conversion ratio of the PMI monomer and styrene monomer during copolymerization. This can result in a loss of physical properties and impact strength. To overcome this problem, the composition can be adjusted by adding PMI according to degree of polymerization in each reactor, but this method is complicated.

It can be easy from a processing perspective to use liquid AMS monomer to prepare heat resistant ABS in a polymerization process and further the price of the raw materials is low compared to powder forms of PMI monomer. However, it is difficult to prepare a product having both excellent high heat resistance and high impact strength in a continuous ABS polymerizing process having a relatively high polymerization temperature because AMS monomer can self-depolymerize. Because the polymer melt is delivered in the continuous process at a temperature greater than the temperature at which PAMS is depolymerized, molecular weight can be reduced. Further, the rubber form can be destabilized during phase inversion polymerization of the rubber and matrix or polymerization after phase inversion. Accordingly, this method has limited usefulness for preparing products which have low heat resistance whether AMS monomer is used or not in a generally continuous ABS process.

SUMMARY OF THE INVENTION

The present invention provides a thermoplastic resin that can have low gloss, good heat resistance and/or good impact strength and a method of preparing the same. In an exemplary embodiment of the present invention, the thermoplastic resin is obtained by copolymerizing conjugated diene rubber (A), aromatic rubber copolymer (B), heat resistant aromatic vinyl compound (C), aromatic vinyl compound (D), unsaturated nitrile compound (E) and cross linking agent (F). The heat resistant aromatic vinyl compound (C) can be alpha methyl styrene.

The weight-average molecular weight of the thermoplastic resin can be about 100,000 to about 160,000 and the molecular weight distribution can be about 2 to about 4.

The average gloss value of ten samples of the thermoplastic resin can be about 50 to about 70. The average gloss value is measured using a BYK-Gardner Gloss Meter, after preparing injection molded samples with a size of 10 cm×10 cm. Further, the impact strength measured in accordance with ASTM D256 can be about 18 to about 35 (kgfcm/cm, ⅛" Notched), the melt index measured in accordance with ASTM D1238 can be about 3 to about 7 (220° C., 10 kg) and the Vicat softening temperature measured in accordance with ISO R 306 can be about 105 to about 110° C. (5 kg, 50° C./hr).

In an exemplary embodiment of the present invention, the method includes continuously polymerizing conjugated diene rubber (A), aromatic rubber copolymer (B), heat-resistant aromatic vinyl compound (C), aromatic vinyl compound (D), unsaturated nitrile compound (E), cross linking agent (F) and initiator (G) in a plurality of reactors. The number of the plurality of reactors can be about 2 to about 5.

Each reactor can be maintained at a temperature of about 90 to about 150° C. and a final polymerization reactor of the plurality of reactors can be maintained at a temperature of about 110 to about 140° C.

The method may further include delivering the polymer to a devolatizer apparatus and removing unreacted reactants and/or volatile components. In this embodiment, the polymer can be maintained at a temperature of about 140 to about 160° C. The devolatizer apparatus may be operated under the conditions of a temperature of about 230 to about 260° C. and a pressure of about 100 torr or less.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein the term "and/or" includes any and all combinations of one or more of the associated listed items. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The thermoplastic resin of the present invention which can have excellent heat resistance and impact strength can be prepared by continuously copolymerizing conjugated diene rubber (A), rubbery aromatic copolymer (B), heat resistant aromatic vinyl compound (C), aromatic vinyl compound (D), unsaturated nitrile compound (E) and cross linking agent (F).

In an exemplary embodiment of the present invention, the thermoplastic resin may comprise about 5 to about 20% by weight of the conjugated diene rubber (A), about 0.5 to about 8% by weight of the rubbery aromatic copolymer (B), about 15 to about 29% by weight of the heat resistant aromatic vinyl compound (C), about 10 to about 50% by weight of the aromatic vinyl compound (D), about 10 to about 30% by weight of the unsaturated nitrile compound (E), and about 0.005 to about 0.2 parts by weight of cross linking agent (F), based on the total weight of the thermoplastic resin.

In another embodiment of the present invention, the thermoplastic resin may comprise about 7 to about 15% by weight of the conjugated diene rubber (A), about 1 to about 5% by weight of the rubbery aromatic copolymer (B), about 18 to about 27% by weight of the heat resistant aromatic vinyl compound (C), about 20 to about 45% by weight of the aromatic vinyl compound (D), about 15 to about 25% by weight of the unsaturated nitrile compound (E) and about 0.05 to about 0.1 parts by weight of cross linking agent (F) based on the total weight of the thermoplastic resin.

The thermoplastic resin may have a weight average molecular weight (Mw) of about 100,000 to about 160,000, and a molecular weight distribution of about 2 to about 4, for example about 2.2 to about 3.5.

In an exemplary embodiment of the present invention, the thermoplastic resin can be prepared by a continuous polymerization process.

In the method of the invention, a reactant mixture may be prepared by mixing conjugated diene rubber (A), rubbery aromatic copolymer (B), heat resistant aromatic vinyl compound (C), aromatic vinyl compound (D), unsaturated nitrile compound (E), cross linking agent (F) and solvent (I). The reactant mixture may be continuously fed into one or more of a plurality of reactors linked in series, and the polymer is prepared by polymerizing the mixture in multiple (i.e. at least two or more) of the reactors in series. For example, the reactant mixture may be fed to a first reactor in the series of reactors (for example a series of 2 to 5 reactors), polymerized in the first reactor, and polymer from the first reactor may be transferred downstream to another reactor in the series to further polymerize the polymer. This process can be repeated (polymerize in a reactor and transfer the polymer to a downstream reactor) multiple times (for example using 2 to 5 reactors in series). The reactant mixture may be fed into only one of the reactors in the series (for example, the first reactor), or alternatively the reactant mixture can be fed into more than one of the reactors in the series.

In an exemplary embodiment of the present invention, various reaction conditions and variables such as feed rate, reaction temperature, residence time, and the type and amount of an initiator added to the reactant can be constantly controlled to maintain a desired polymerization rate within each reactor. The skilled artisan will appreciate and understand exemplary reaction conditions and variables suitable for use in the present invention, which can be in accordance with conventional conditions and variables, without undue experimentation.

In an exemplary embodiment, the temperature of each reactor may be maintained at about 90 to about 150° C., for example about 110 to about 140° C., although the temperature of the final polymerization reactor of the plural reactors can be maintained at a temperature of about 110 to about 140° C. If the temperature of the final reactor is less than about 110° C., economical efficiency can be reduced due to low production yield and energy can be wasted in a devolatizer apparatus removing residual reactants and/or volatile products. If the temperature of the final reactor is higher than about 140° C., the molecular weight of the polymer may be too low to provide the desired heat resistance.

In an exemplary embodiment of the present invention, after the polymer is prepared by a continuous polymerization process in a plurality of reactors, the method can further include the step of delivering the prepared polymer to the devolatizer apparatus and removing residual reactants and/or volatile products.

When the polymer is delivered from the final reactor to the devolatizer, the temperature of the polymer may be maintained at a temperature of about 140 to 160° C. Generally, the polymer may be delivered by a pipe connecting the reactor and the devolatizer apparatus. If the temperature of the polymer is less than about 140° C. in the delivering process, it may be difficult to deliver the polymer. If the temperature of the polymer is less than about 160° C., the polymer may not have the desired heat resistance and impact strength due to low molecular weight resulting from depolymerization of the heat resistant aromatic vinyl compound (C).

Additionally, the devolatizer apparatus may be operated under the conditions of a temperature of about 230 to about 260° C. and a pressure of about 100 torr or less. If the temperature of the devolatizer apparatus is less than about 230° C. and the pressure of the devolatizer apparatus is higher than about 100 torr, impact strength and color property of the final thermoplastic resin can be reduced because volatile component remaining in the polymer may not be sufficiently removed. If the temperature of the devolatizer apparatus is higher than about 260° C., color property can be reduced because the polymer may be carbonized.

As described above, the amount of volatile component remaining in the thermoplastic polymer prepared by the method of the present invention can be less than about 1,500 ppm.

Each component of the thermoplastic resin of the present invention now will be described more fully hereinafter in the following detailed description of the invention.

(A) Conjugated Diene Rubber

A polymer or a copolymer of conjugated diene compound which has about 4 to about 12 carbons may be used as the conjugated diene rubber (A). For example, the conjugated diene compound may have about 4 to about 8 carbons. Examples of conjugated diene compound that can be used to prepare the conjugated diene rubber (A) may include without limitation 1,3-butadiene, 2-methyl-1,3-butadiene(isoprene), 2-ethyl-1,3-butadiene, 2,3-dimethyl-1,3-butadiene, 1,3-pentadiene, 3-butyl-1,3-octadiene, and the like, and combinations thereof. In exemplary embodiments, 1,3-butadiene, isoprene, or a combination thereof may be used.

In an exemplary embodiment of the present invention, a solution of about 5% by weight butadiene in styrene (prepared by melting the conjugated diene rubber (A) in styrene), which solution may have a viscosity of about 40 to about 80 cps at 25° C., may be used.

If the viscosity of the solution is less than about 40 cps, the resin may not have the desired low gloss property because the rubber particles may be too small. If the viscosity of the solution is higher than about 80 cps, impact strength may be low because the rubber particles of final product may be too large.

The conjugated diene rubber (A) may be used in an amount of about 5 to about 20% by weight, for example about 7 to about 15% by weight, based on the total weight of the reactants used to prepare the thermoplastic resin. If the amount of the conjugated diene rubber (A) is less than about 5% by weight, the resin may not have the desired high impact strength, and if the amount of the conjugated diene rubber (A) is more than about 20% by weight, the resin may not have the desired heat resistance.

(B) Rubbery Aromatic Copolymer

In an exemplary embodiment of the present invention, a copolymer of a conjugated diene compound and an aromatic vinyl compound may be used as the rubbery aromatic copolymer (B). The rubbery aromatic copolymer may be prepared by copolymerizing about 50 to about 80% by weight of the conjugated diene compound and about 20 to about 50% by weight of the aromatic vinyl compound.

Exemplary conjugated diene compounds may include without limitation 1,3-butadiene, 2-methyl-1,3-butadiene, 2-ethyl-1,3-butadiene, 2,3-dimethyl-1,3-butadiene, 1,3-pentadiene, 3-butyl-1,3-octadiene and the like, and combinations thereof. In exemplary embodiments 1,3-butadiene may be used.

The aromatic vinyl compound used to prepare the rubbery aromatic copolymer (B) can be used in an amount of about 20 to about 50% by weight, for example about 25 to about 35% by weight, based on about 100% by weight of the rubbery aromatic copolymer (B). If the amount of the aromatic vinyl compound is less than about 20% by weight, it can be difficult to control the balance between low gloss property and impact strength because the aromatic vinyl compound may not reduce cohesion of particles of the simultaneously used conjugated diene compound. If the amount of the aromatic vinyl compound is more than about 50% by weight, it may be difficult to provide the desired high impact strength because the total amount of rubber is reduced.

Exemplary aromatic vinyl compounds may include without limitation styrene, α-methyl styrene, 2-methyl styrene, 3-methyl styrene, 4-methyl styrene, 2-ethyl styrene, 3-ethyl styrene, 4-ethyl styrene, 4-n-butyl styrene, 1-vinyl naphthalene, 2-vinyl naphthalene and the like, and combinations thereof. The aromatic vinyl compound may be used singly or in combination.

In an embodiment of the present invention, the aromatic rubbery copolymer (B) can be a tapered copolymer (rubber component-unsaturated monomer), a linear copolymer, a di-block copolymer, a tri-block copolymer or a combination thereof.

The method of preparing the aromatic rubbery copolymer (B) will be readily understood by one skilled in the art. Aromatic rubbery copolymer (B) useful in the present invention is commercially available from Asahi Kasei Chemical Corporation, Kumho Petrochemical, Chevron-Phillips, Kraton, and Atofina.

In an embodiment of the present invention, the aromatic rubbery copolymer (B) may used in an amount of about 0.5 to about 8% by weight, for example about 1 to about 5% by weight, based on total weight of the reactants. If the amount of the aromatic rubbery copolymer (B) is less than about 0.5% by weight, it may be difficult to control the balance between low gloss property and high impact strength because it is difficult to prepare rubber particles having a stable rubber morphology. If the amount of the aromatic rubbery copolymer (B) is more than about 8% by weight, the resin may not have the desired impact strength.

(C) Heat Resistant Aromatic Vinyl Compound

In an embodiment of the present invention, an aromatic vinyl compound having a structure for improving heat resistance may be used as the heat resistant aromatic vinyl compound (C), for example, α-methyl styrene.

The heat resistant aromatic vinyl compound (C) may used in an amount of about 15 to about 29% by weight, for example about 18 to about 27% by weight, and as another example about 19 to about 25% by weight, based on total weight of the reactants. If the amount of the heat resistant aromatic vinyl compound (C) is less than about 15% by weight, it may be difficult to achieve the desired heat resistance, and if the amount of the heat resistant aromatic vinyl compound (C) is more than about 29% by weight, it may be difficult to achieve both impact strength and heat resistance because the molecular weight can be significantly reduced during the polymerization process.

(D) Aromatic Vinyl Compound

Exemplary aromatic vinyl compounds (D) used in the present invention may include without limitation styrene, 2-methyl styrene, 3-methyl styrene, 4-methyl styrene, 2-ethyl styrene, 3-ethyl styrene, 4-ethyl styrene, 4-n-propyl styrene, 4-t-butyl styrene, 1-vinyl naphthalene, 2-vinyl naphthalene, vinyl toluene and the like and combinations thereof. The aromatic vinyl compound (D) can be used singly or in combination. In an exemplary embodiment, styrene may be used. The aromatic vinyl compound (D) may used in an amount of about 10 to about 50% by weight, for example about 15 to about 45% by weight, and as another example about 20 to about 43% by weight, based on total weight of the reactants, and the amount can be selected depending on the desired properties of the final product.

(E) Unsaturated Nitrile Compound

Exemplary unsaturated nitrile compounds (E) include without limitation acrylonitrile, methacrylonitrile and the like and combinations thereof. The unsaturated nitrile compound (E) may be used in an amount of about 10 to about 30% by weight, for example about 13 to about 25% by weight, and as another example about 15 to about 20% by weight, based on the total weight of the reactants and the amount can be selected depending on the desired properties of the final product.

(F) Cross Linking Agent

The cross linking agent may be a multifunctional vinyl compound. Examples of the multifunctional vinyl compound include without limitation divinylbenzene, ethylene glycol dimethacrylate, allyl methacrylate, diallylphthalate, diallyl maleate, triallylisocyanurate and the like and combinations thereof. The cross linking agent may be used in an amount of about 0.005 to about 0.2 parts by weight, for example about 0.01 to about 0.15 parts by weight, and as another example about 0.05 parts by weight, based on about 100 parts by weight of (A)+(B)+(C)+(D)+(E)+(H) as defined herein. If the amount of the cross linking agent is less than about 0.005 parts by weight, there may be little or no improvement of impact strength and thermal resistance, and if the amount of the cross linking agent is more than about 0.2 parts by weight, the polymerization reaction may be unstable and a rubber gel can appear.

(G) Initiator

Exemplary initiators may include without limitation benzoyl peroxide, t-butyl peroxyisobutyrate, 1,1-bis(t-butylperoxy)cyclohexane, 2,2-bis(4,4-di-t-butylperoxy cyclohexane) propane, t-hexyl peroxy isopropyl monocarbonate, t-butyl peroxylaurate, t-butyl peroxy isopropyl monocarbonate, t-butyl peroxy 2-ethylhexyl monocarbonate, t-hexyl peroxybenzoate, t-butyl peroxyacetate, 2,2-bis(t-butyl peroxy)butane, t-butyl peroxybenzoate, dicumyl peroxide, 2,5-dimethyl-2,5-bis(t-butyl peroxy)hexane, t-butyl cumyl peroxide, di-t-butyl peroxide, di-t-amyl peroxide, and the like, and combinations thereof.

The initiator (G) may be used in an amount of about 0.01 to about 0.5 parts by weight, for example about 0.04 to about 0.1 parts by weight, based on about 100 parts by weight of (A)+(B)+(C)+(D)+(E)+(H) as defined herein. If the initiator is used in an amount of more than about 0.5 part, it may be difficult to control reaction time and residual temperature, or the impact strength may be reduced due to a lower molecular weight of the produced polymer. If the initiator is used in an amount of less than about 0.01 part, it may be difficult to achieve the desired conversion ratio due to significant reduction of the reaction rate.

(H) Organic Solvent

The present invention can optionally further comprise organic solvent (H). The organic solvent (H) may be inactive (inert) to the polymerization reaction and can dissolve both reactant and polymer. Exemplary solvents include without limitation alcohols, aromatic hydrocarbons such as petroleum ether and ethyl benzene, halides such as carbon tetrachloride and chloroform, ketones such as methylethyl ketone and the like and combinations thereof. The organic solvent (H) may be used in an amount of about 0 to about 30% by weight, for example about 5 to about 20% by weight, and as another example about 10 to about 25% by weight, based on the total weight of the reactants.

The invention may be better understood by reference to the following examples which are intended for the purpose of illustration and are not to be construed as in any way limiting the scope of the present invention, which is defined in the claims appended hereto.

EXAMPLES

Example 1

9 parts by weight of a 5% by weight solution of butadiene rubber in styrene (ASAPRENE 700A; Asahi Kasei Chemical Corporation) having a viscosity of 45 cps and 1 part by weight of a 5% by weight solution of styrene-butadiene copolymer in styrene (ASAPRENE 670A; Asahi Kasei Chemical Corporation) having a viscosity of 40 cps and comprising 39% by weight of styrene are melted into a solution comprising 20.25 parts by weight of α-methyl styrene, 36 parts by weight of styrene, 18.75 parts by weight of acrylonitrile and 15 parts by weight of ethylbenzene solvent, and 0.045 parts by weight of 1,1-bis(t-butylperoxy)cyclohexane as initiator and 0.05 parts by weight of divinylbenzene are added to prepare a reactant mixture. The reactant mixture is injected into the first reactor at 25 kg/hr.

The first reactor is controlled at a polymerizing temperature of 110° C., a screw-rotating speed of 120 rpm, and a rate of polymerization of 25%. The resultant polymer from the first reactor is fed to a second reactor which is controlled at a polymerizing temperature of 121° C., a screw-rotating speed of 100 rpm, and a rate of polymerization of 46%. The resultant polymer from the second reactor is fed to a third reactor which is controlled at a polymerizing temperature of 130° C., a screw-rotating speed of 60 rpm, and a rate of polymerization of 68% to prepare a polymer.

The polymer is delivered as a polymer melt at a temperature of 160° C. by a pipe delivering polymer to a devolatizer and zapper. The devolatizer removes residual or remaining reactants and/or volatile components and a thermoplastic resin is prepared in the form of pellets.

Example 2

The preparation process is carried out using the same method as preparation Example 1 except that 8 parts by weight of a 5% by weight solution of butadiene rubber in styrene having a solution viscosity of 45 cps and 2 parts by weight of a 5% by weight solution of styrene-butadiene copolymer in styrene having a solution viscosity of 40 cps and comprising 39% by weight of styrene are used.

Example 3

The preparation process is carried out using the same method as Preparation Example 1 except that 6 parts by weight of a 5% by weight solution of butadiene rubber in styrene having a solution viscosity of 45 cps and 4 parts by weight of a 5% by weight solution of styrene-butadiene copolymer in styrene having a solution viscosity of 40 cps and comprising 39% by weight of styrene are used.

Example 4

The preparation process is carried out using the same method as Preparation Example 1 except that the third reactor is controlled at a polymerizing temperature of 120° C. and a rate of polymerization of 68% to prepare a polymer.

Example 5

The preparation process is carried out using the same method as Preparation Example 1 except that the polymer is delivered as a polymer melt at a temperature of 150° C. via a pipe delivering polymer to a devolatizer and zapper.

Comparative Example 1

The preparation process is carried out using the same method as Preparation Example 1 except that 9 parts by weight of a 5% by weight solution of butadiene rubber in styrene having a solution viscosity of 45 cps is only used.

Comparative Example 2

The preparation process is carried out in the same method as Preparation Example 1 except that 10 parts by weight of a 5% by weight solution of styrene-butadiene copolymer in styrene which has a solution viscosity of 40 cps and comprising 39% by weight of styrene is only used.

Comparative Example 3

The preparation process is carried out using the same method as Preparation Example 1 except that 11.25 parts by weight of α-methyl styrene, 45 parts by weight of styrene, and 18.75 parts by weight of acrylonitrile are used.

Comparative Example 4

The preparation process is carried out using the same method as Preparation Example 1 except that 30 parts by weight of α-methyl styrene, 26.25 parts by weight of styrene, and 18.75 parts by weight of acrylonitrile are used.

Comparative Example 5

The preparation process is carried out using the same method as Preparation Example 1 except that the third reactor is controlled at a polymerizing temperature of 150° C. and a rate of polymerization of 68% to prepare a polymer.

Comparative Example 6

The preparation process is carried out using the same method as Preparation Example 1 except that the polymer is delivered as a polymer melt at a temperature of 180° C. via a pipe delivering polymer to a devolatizer and zapper.

The respective foregoing components in the amounts of Example 1 to 5 and Comparative Example 1 to 6 are represented in the following Table 1.

TABLE 1

|  | (A) | (B) | (C) | (D) | (E) | (F) | (G) | (H) |
|---|---|---|---|---|---|---|---|---|
| Example 1 | 9 | 1 | 20.25 | 36 | 18.75 | 0.05 | 0.045 | 15 |
| Example 2 | 8 | 2 | 20.25 | 36 | 18.75 | 0.05 | 0.045 | 15 |
| Example 3 | 6 | 4 | 20.25 | 36 | 18.75 | 0.05 | 0.045 | 15 |
| Example 4 | 9 | 1 | 20.25 | 36 | 18.75 | 0.05 | 0.045 | 15 |
| Example 5 | 9 | 1 | 20.25 | 36 | 18.75 | 0.05 | 0.045 | 15 |
| Comparative Example 1 | 10 | — | 20.25 | 36 | 18.75 | 0.05 | 0.045 | 15 |
| Comparative Example 2 | — | 10 | 20.25 | 36 | 18.75 | 0.05 | 0.045 | 15 |
| Comparative Example 3 | 9 | 1 | 11.25 | 45 | 18.75 | 0.05 | 0.045 | 15 |
| Comparative Example 4 | 9 | 1 | 30 | 26.25 | 18.75 | 0.05 | 0.045 | 15 |
| Comparative Example 5 | 9 | 1 | 20.25 | 36 | 18.75 | 0.05 | 0.045 | 15 |
| Comparative Example 6 | 9 | 1 | 20.25 | 36 | 18.75 | 0.05 | 0.045 | 15 |

Physical Properties Measurement

Physical properties of the thermoplastic resin prepared by Examples 1 to 5 and Comparative Examples 1 to 6 are measured by the following methods and the results are presented in the following Tables 2 and 3.

(1) Weight average molecular weight: An elution curve is drawn up by gel-permeation chromatography (GPC, LF-804 column manufactured by Waters Corporation) using THF as a moving phase and relative number average molecular weight, weight average molecular weight and polydispersity index (PDI) are analyzed on the basis of the standard polystyrene polymer.

(2) Izod impact strength (kgfcm/cm, ⅛" Notched): Izod impact strengths are measured according to ASTM 256

(3) Fluidity (220° C., 10 kg): Melt flow indexes of the samples are measured according to ASTM D-1238.

(4) Vicat softening point (5 kg, 50° C./hr): Vicat softening points of the samples are measured according to ISO R 306.

(5) Glossiness: the 60 degree glossiness of ten test specimens is measured using a BYK-Gardner Gloss Meter after preparing injection molded test specimens with a size of 10 cm×10 cm.

TABLE 2

|  | Example 1 | Example 2 | Example 3 | Example 4 | Example 5 |
|---|---|---|---|---|---|
| Temperature (° C.) of the third reactor (R3) | 130 | 130 | 130 | 120 | 130 |
| Temperature (° C.) of delivering pipe (R3–> the devolatizer apparatus) | 160 | 160 | 160 | 160 | 150 |

TABLE 2-continued

|  | Example 1 | Example 2 | Example 3 | Example 4 | Example 5 |
|---|---|---|---|---|---|
| Weight average molecular weight | 136,600 | 132,300 | 136,200 | 142,300 | 136,800 |
| molecular weight distribution | 2.7 | 2.7 | 2.6 | 2.7 | 2.6 |
| Izod impact strength (kgfcm/cm, 1/8" Notched) | 22.3 | 22.6 | 20.8 | 23.2 | 21.3 |
| Melt index (220° C., 10 kg) | 4.5 | 4.3 | 5.1 | 4.1 | 4.6 |
| Vicat softening point (5 kg, 50° C./hr) | 106.4 | 106.5 | 106.9 | 107.4 | 106.8 |
| 60 degree glossiness | 62 | 65 | 60 | 10 | 64 |

TABLE 3

|  | Comparative Example 1 | Comparative Example 2 | Comparative Example 3 | Comparative Example 4 | Comparative Example 5 | Comparative Example 6 |
|---|---|---|---|---|---|---|
| Temperature (° C.) of the third reactor (R3) | 130 | 130 | 130 | 130 | 150 | 130 |
| Temperature (° C.) of delivering pipe (R3−> the devolatizer apparatus) | 160 | 160 | 160 | 160 | 160 | 180 |
| Weight average molecular weight | 123,400 | 138,200 | 148,200 | 113,000 | 121,400 | 124,800 |
| Izod impact strength (kgfcm/cm, 1/8" Notched) | 6.8 | 8.2 | 24.3 | 11.6 | 16.3 | 19.2 |
| Melt flow index (220° C., 10 kg) | 3.9 | 4.5 | 3.6 | 10.4 | 8.2 | 7.1 |
| Vicat softening point (5 kg, 50° C./hr) | 103.4 | 106.3 | 101.1 | 104.8 | 103.8 | 103.1 |
| The 60 degree glossiness | 48 | 41 | 78 | 52 | 64 | 68 |

From the results shown in the above Table 2 and 3, when a combination of conjugated diene rubber having a particular viscosity and aromatic rubbery copolymer and heat resistant aromatic vinyl compound are used together, a low gloss thermoplastic resin having excellent heat resistance and impact strength can be prepared by controlling the conditions of the continuous polymerization. Moreover, products having a low gloss compared to existing thermoplastic resin can be prepared by using a combination of conjugated diene rubber having a particular viscosity and aromatic rubbery copolymer and heat resistant aromatic vinyl compound.

However, Comparative Examples 1 and 2 which do not use a combination of conjugated diene rubber and aromatic rubbery copolymer and heat resistant aromatic vinyl compound show reduced heat resistance and impact strength. Comparative Example 3 which uses an excessive amount of heat resistant aromatic vinyl compound does not have improved heat resistance, or heat resistance is decreased and impact strength is decreased because of reduced polymer molecular weight. Comparative Example 4 which uses a smaller amount of heat resistant aromatic vinyl compound than the present invention does not have the excellent heat resistance of the present invention. Products having high heat resistance can be prepared by controlling polymerizing conditions and processing conditions.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A low gloss thermoplastic resin that can have heat resistance and impact strength prepared by copolymerizing about 5 to about 20% by weight of a conjugated diene rubber (A), about 0.5 to about 8% by weight of an aromatic rubber copolymer (B), about 15 to about 29% by weight of a heat resistant aromatic vinyl compound (C), wherein said heat resistant aromatic vinyl compound (C) is α-methyl styrene, about 10 to about 50% by weight of an aromatic vinyl compound (D), about 10 to about 30% by weight of an unsaturated nitrile compound (E) and about 0.005 to about 0.2 parts by weight of a cross linking agent (F), based on the total weight of the thermoplastic resin.

2. The low gloss thermoplastic resin of claim 1, wherein the conjugated diene rubber (A) is an about 5% by weight solution of the conjugated diene rubber prepared by melting the conjugated diene rubber (A) in styrene and has a viscosity of about 40 to about 80 cps at 25° C.

3. The low gloss thermoplastic resin of claim 1, wherein said rubbery aromatic copolymer (B) comprises about 50 to about 80% by weight of conjugated diene compound and about 20 to about 50% by weight of aromatic vinyl compound, and wherein said conjugated diene compound comprises 1,3-butadiene, 2-methyl-1,3-butadiene, 2,3-dimethyl-1,3-butadiene, 1,3-pentadiene, 3-butyl-1,3-octadiene or a combination thereof.

4. The low gloss thermoplastic resin of claim 1, wherein said cross linking agent (F) is divinylbenzene, ethylene glycol dimethacrylate, allyl methacrylate, diallylphthalate, diallyl maleate, triallylisocyanurate or a combination thereof.

5. The low gloss thermoplastic resin of claim 1, wherein the average molecular weight of the low gloss thermoplastic resin is about 100,000 to about 160,000 and the molecular weight distribution is about 2 to about 4.

6. The low gloss thermoplastic resin of claim 1, wherein the average gloss value of ten injection molded samples with a size of 10 cm×10 cm of the thermoplastic resin is about 50 to about 70 measured by using a BYK-Gardner Gloss Meter.

7. The low gloss thermoplastic resin of claim 1, having an impact strength measured in accordance with ASTM D256 of about 18 to about 35 (kgfcm/cm, ⅛" Notched), a melt index measured in accordance with ASTM D1238 of about 3 to about 7 (220° C., 10 kg) and a Vicat softening temperature measured in accordance with ISO R 306 of about 105 to about 115° C. (5 kg, 50° C./hr).

8. A method for preparing a low gloss thermoplastic resin that can have excellent heat resistance and impact strength, comprising: polymerizing conjugated diene rubber (A), aromatic rubber copolymer (B), heat-resistant aromatic vinyl compound (C), aromatic vinyl compound (D), unsaturated nitrile compound (E), cross linking agent (F) and initiator (G) in a plurality of reactors.

9. The method of claim 8, wherein each reactor is maintained at temperature of about 90 to about 150° C.

10. The method of claim 8, wherein the final polymerization reactor of the plurality of reactors is maintained at a temperature of about 110 to about 140° C.

11. The method of claim 8, further comprising delivering said polymerized polymer to a devolatizer apparatus and removing volatile components of the polymer.

12. The method of claim 11, wherein the temperature of the polymer is maintained at about 140 to about 160° C. while the polymer is delivered.

13. The method of claim 12, wherein said devolatizer apparatus is operated under conditions of a temperature of about 230 to about 260° C. and a pressure of about 100 torr or less.

14. The method of claim 8, wherein the number of the plurality of reactors is about 2 to about 5.

15. The method of claim 8, wherein said polymerizing step further comprises the use of an organic solvent (H).

* * * * *